(12) United States Patent
Montgomery et al.

(10) Patent No.: US 12,271,854 B2
(45) Date of Patent: Apr. 8, 2025

(54) SYSTEMS AND METHODS FOR GENERATING USE OF FORCE INDICATORS

(71) Applicant: Benchmark Solutions, LLC, Chicago, IL (US)

(72) Inventors: Nicholas Montgomery, Chicago, IL (US); Ron Huberman, Chicago, IL (US)

(73) Assignee: Benchmark Solutions, LLC, Chicago, IL (US)

( * ) Notice: Subject to any disclaimer, the term of this patent is extended or adjusted under 35 U.S.C. 154(b) by 349 days.

(21) Appl. No.: 17/370,870

(22) Filed: Jul. 8, 2021

(65) Prior Publication Data
US 2022/0012669 A1 Jan. 13, 2022

Related U.S. Application Data

(60) Provisional application No. 63/049,654, filed on Jul. 9, 2020.

(51) Int. Cl.
| | |
|---|---|
| *G06Q 10/00* | (2023.01) |
| *G06N 5/04* | (2023.01) |
| *G06N 20/00* | (2019.01) |
| *G06Q 10/0639* | (2023.01) |
| *G06Q 30/018* | (2023.01) |
| *G06Q 50/26* | (2012.01) |

(52) U.S. Cl.
CPC ......... *G06Q 10/06398* (2013.01); *G06N 5/04* (2013.01); *G06N 20/00* (2019.01); *G06Q 30/018* (2013.01); *G06Q 50/26* (2013.01)

(58) Field of Classification Search
CPC .................. G06Q 10/06398; G06Q 50/26
See application file for complete search history.

(56) References Cited

U.S. PATENT DOCUMENTS 8,549,028 B1 * 10/2013 Alon ................... G06F 16/9537
707/769
9,699,401 B1 * 7/2017 Jones ............... H04N 21/41407
(Continued)

OTHER PUBLICATIONS

Hine, K. A., Porter, L. E., Westera, N. J., Alpert, G. P., & Allen, A. (2018). Exploring police use of force decision-making processes and impairments using a naturalistic decision-making approach. Criminal Justice and Behavior, 45(11), 1782-1801. (Year: 2018).*

(Continued)

*Primary Examiner* — Hafiz A Kassim
*Assistant Examiner* — Scott M Ross
(74) *Attorney, Agent, or Firm* — Prospect Law LLP

(57) ABSTRACT

A system and method for determining a score reflecting the use of force that a police officer applied in an incident, comprising a computer system for collecting, storing and processing data relating to an incident involving the police officer's use of force in one or more interactions within an incident; the computer system iteratively generating scores for each use of force interactions within the incident; the computer system comparing the police officer's use of force score, whether overall or for an interaction to a score for a group of officers; and, the computer system generating a risk score by running a model based on the use of force score.

13 Claims, 13 Drawing Sheets

1200

| Subject Action | Officer Action | Subject Action Score | Officer Action Score |
|---|---|---|---|
| Flee | Physical-Used Arm Bar | 1 | 2 |
| Subject-Physical-Head | CED | 2 | 3 |
| | | | |
| | Total | 3 | 5 |

| | Score |
|---|---|
| Starting Subject Action | 1 |
| Starting Officer Action | 2 |
| Starting Proportionality | 0 |
| Starting Escalation | 1 |
| Total Subject Action | 3 |
| Total Officer Action | 5 |
| Subject Highest Action | 2 |
| Officer Highest Action | 3 |
| Highest Action Proportion | 0 |
| Highest Proportionality | 0 |
| Subject Escalation | 1 |
| Officer Escalation | 2 |
| Number of Interactions | 2 |

(56) References Cited

U.S. PATENT DOCUMENTS

| | | | | |
|---|---|---|---|---|
| 2003/0120589 A1* | 6/2003 | Williams | ............... | G06Q 40/03 |
| | | | | 705/7.42 |
| 2003/0160818 A1* | 8/2003 | Tschiegg | ................ | G06Q 40/08 |
| | | | | 715/743 |
| 2012/0268269 A1* | 10/2012 | Doyle | .................... | G08B 21/22 |
| | | | | 340/539.13 |
| 2016/0286156 A1* | 9/2016 | Kovac | .................... | G06Q 50/26 |
| 2017/0200246 A1* | 7/2017 | Hedayati | ................ | G06Q 10/10 |
| 2017/0336294 A1 | 11/2017 | Dimino, Jr. et al. | | |
| 2017/0339542 A1* | 11/2017 | Bocanegra | ........ | H04M 1/72418 |
| 2019/0087766 A1* | 3/2019 | Parham | .......... | G06Q 10/06393 |
| 2019/0164244 A1* | 5/2019 | Ghaffar | ................. | G06Q 50/26 |
| 2021/0263965 A1* | 8/2021 | Li | .......................... | G06V 20/41 |

OTHER PUBLICATIONS

International Search Report and Written Opinion of the International Searching Authority PCT/US 21/40938 Dated Oct. 21, 2021.

\* cited by examiner

Incident 1 - Interaction Sequence

Officer-Subject Use Of Force Sequence 5 ✕

600

[Officer C. Smith ▾]  [Discharged Chemical At ▾]  [Subject John Doe ▾]
       602                    604                       606

Select Area Of Body Where Force Was Applied On Subject:

610, 612, 614, 608, 616

| Body Contact Front | Right Eye X | Left Eye X | Nose X | Body Contact Back | Please Select |

Chemical Type [ 618 ]   Chemical Serial Number [ 620 ]

Position When Using Chemical [Please Select ▾] 626

Protective Barrier Used [ No ] ← 628    Subject Struck? [ Yes ] ← 630

Subject Decontaminated After Usage? [ No ] ← 632    Accidental Discharge? [ No ] ← 634

Distance When First Used [ Next To Driver Side Window ]  622    Distance When Last Used [ 624 ]

| Subject Action | Officer Action | Subject Action Score | Officer Action Score |
|---|---|---|---|
| Traffic Violation | Verbal Commands | 0 | 1 |
| Subject Spit | Physical-Take Down | 1 | 2 |
| Subject Punch | Chemical Spray | 2 | 3 |
| | Total | 3 | 6 |
| | Score | | |
| Starting Subject Action | 0 | | |
| Starting Officer Action | 1 | | |
| Starting Proportionality | 0 | | |
| Starting Escalation | 1 | | |
| Total Subject Action | 3 | | |
| Total Officer Action | 6 | | |
| Subject Highest Action | 2 | | |
| Officer Highest Action | 3 | | |
| Highest Action Proportion | 0 | | |
| Highest Proportionality | 0 | | |
| Subject Escalation | 1 | | |
| Officer Escalation | 3 | | |
| | | | |

FIG. 7

Incident 2 - Interaction Sequence

1200

| Subject Action | Officer Action | Subject Action Score | Officer Action Score |
|---|---|---|---|
| Flee | Physical-Used Arm Bar | 1 | 2 |
| Subject-Physical-Head | CED | 2 | 3 |
|  |  |  |  |
|  | Total | 3 | 5 |
|  | Score |  |  |
| Starting Subject Action | 1 |  |  |
| Starting Officer Action | 2 |  |  |
| Starting Proportionality | 0 |  |  |
| Starting Escalation | 1 |  |  |
| Total Subject Action | 3 |  |  |
| Total Officer Action | 5 |  |  |
| Subject Highest Action | 2 |  |  |
| Officer Highest Action | 3 |  |  |
| Highest Action Proportion | 0 |  |  |
| Highest Proportionality | 0 |  |  |
| Subject Escalation | 1 |  |  |
| Officer Escalation | 2 |  |  |
| Number of Interactions | 2 |  |  |

FIG. 12

Use of Force Activity

| | Outlier Status | Officer | Dept | Unit | Peer Group |
|---|---|---|---|---|---|
| Use of Force | Expected | 10 | 10 | 10 | 10 |
| Total \| Percent Adverse Events | Very High | 6 (20%) | 4 (10%) | 4 (10%) | 4 (10%) |
| Total \| Percent Disproportionate Force | High | 3 (40%) | 1 (10%) | 1 (10%) | 1 (10%) |
| Total \| Percent Subject Resistance | Expected | 4 (10%) | 4 (10%) | 4 (10%) | 4 (10%) |
| Avg Force Severity | Expected | 34 | 34 | 34 | 34 |
| Avg UoF / Arrests | Expected | 1/12 | 1/13 | 1/13 | 1/13 |

FIG. 13

SYSTEMS AND METHODS FOR GENERATING USE OF FORCE INDICATORS

FIELD OF THE INVENTION

This invention relates generally to a system and method for generating a score or scores for an incident involving a police officer's use of force in an incident. The system generates an overall score for an officer, for an incident and for each individual interaction within an incident. The scores can be compared to the individual or average scores for other officers or groups of officers to determine if a particular officer or an officer in a particular incident used more force that average or than expected in an incident. The scores can also be compared to policies of a department to determine if a particular incident or interaction within an incident was within a department's policy.

BACKGROUND OF THE INVENTION

Police officers encounter individuals on a daily basis. From time to time, incidents occur where an officer uses force during an interaction or in a series of interactions with on another individual or subject.

There is a need for system that can evaluate whether an officer's use of force in a particular incident was more or less than expected as compared to another group of offices or if a particular use of force interaction was not in policy for the department. There is also a need for a system that can provide scores for incidents that involve use of force to rank an officer's use of force with respect to other officers for similar incidents.

SUMMARY

These and other needs are addressed by the present invention, in which data or information about use of force incidents is collected, stored and processed by the system. The data can be analyzed and used to create and identify a model using machine-learning to create a metric from an officer's use of force scores. The metric can then be used in a machine-learning system to determine whether a particular officer is at risk of an adverse event.

Generally, the present system collects, stores and processes information for an incident involving a police officer's use of force. For example, police officer data and subject data can be entered and stored in the system. Also information about the incident can be entered and stored, such as location, date and time, weather conditions, etc. The system can also collect and store information about the type of force applied in the incident. Types of force may include, vehicle pursuit, physical action, OC spray, impact weapon, ECW discharge, or firearm usage. Other information that can be collected and stored about the incident to document the incident may include warnings, use-of-force sequence, charges, resisting arrest, injuries, etc. A detailed description of an incident may also be entered and stored, such as narrative reports from the police officer and any subject statements.

The present invention stems from the realization that in the context of use of force incidents, there is a need to identify whether an officer's actions and/or escalation of use of force are in line with policy or not and to determine whether an officer's use of force and escalation of use of force are greater than expected in a particular incident.

Accordingly, one aspect of the invention relates to a method and software for collecting and storing various data about incidents that involve use of force and determining scores for such uses of force.

Other advantages of the present invention will become readily apparent from the following detailed description. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The foregoing aspects and many of the attendant advantages of the disclosed embodiments will become more readily appreciated by reference to the following detailed description, when taken in conjunction with the accompanying drawings, wherein:

FIG. 6 is an illustration of another example user interface provided by the system for display by the user computing device.

FIG. 7 is an example of a display showing use of force indicators generated by the system for a police officer's use of force in the first incident.

FIG. 12 is an example of a display showing use of force indicators generated by the system for a police officer's use of force in the second incident.

FIG. 13 is an example of a display showing a profile diagram for an officer on use of force.

DETAILED DESCRIPTION

A system and methodology for determining a use of force score for an officer or incident and comparing that use of force score to use of force scores or average use of force scores, for other officers or groups of officers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
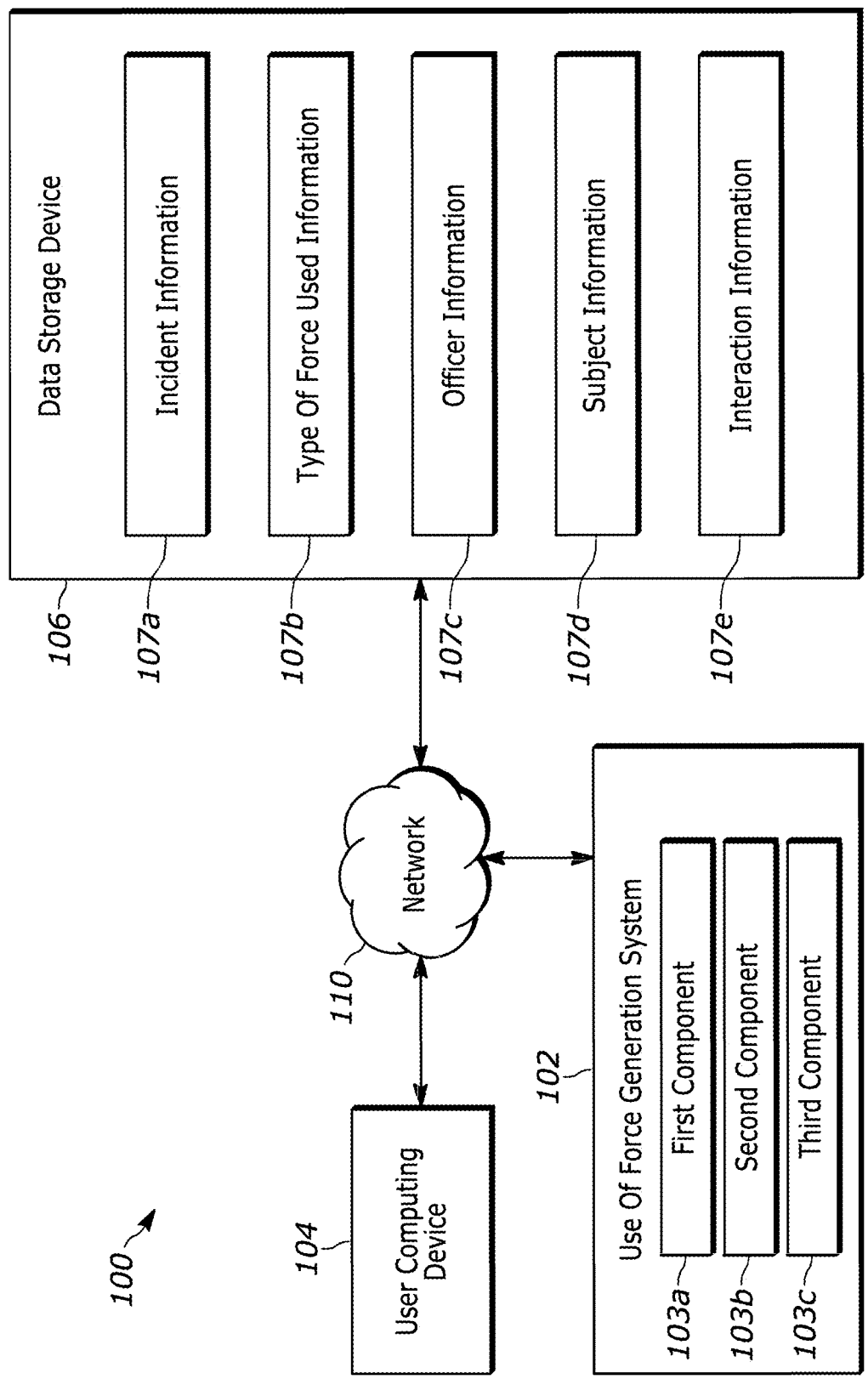
FIG. 1 is a block diagram illustrative of an embodiment of a computing environment for generating use of force indicators for a police officer's use of force in an incident.

Turning now turn to FIG. 1, a block diagram illustrating an embodiment of a computing environment 100 for a system for collecting, storing and processing information for one or more incidents involving a police officer's use of force is shown. The computing environment 100 includes a use of force generation system 102, a user computing device 104, and a data storage device or system 106, each in communication via a network 110.

Embodiments of the use of force generation system 102 and the user computing device 104 may be independently selected by any computing device such as desktop computers, laptop computers, mobile phones, tablet computers, server computers, client computers, and the like. Embodiments of the data storage device or system 106 may include one or more data storage devices capable of maintaining computer-readable data. Examples may include, but are not limited to, magnetic storage (e.g., hard disk drives, etc.), solid state storage (e.g., flash memory, etc.), network storage, and other computer-readable media known in the art. Embodiments of the network 110 may include, but are not limited to, local area networks (LANs), wide area networks (WAN), the Internet, wired networks, wireless networks), and telephone networks.

The use of force system 102 includes a one or more components, shown generically as 103A, 103B and 103C, used to collect, store and process various types of information and to generate various use of force indicators and scores. As described in more detail below, various components can be used to store or generate scores for actions, proportionality scores and escalation scores. Further, the various components may store or generate this information for an individual action, an interaction with several actions, for an officer and for a group of officers. One or more components may be used to analyze use of force data and to create and identify a model using machine-learning to create a metric from an officer's use of force scores. One or more components may use machine-learning to determine whether a particular officer is at risk of an adverse event. Furthermore, while the system 102 is illustrated in FIG. 1 as a single device, it may be understood that functionalities of one or more of the components 103A-C, may be performed by a distributed computing environment including a plurality of computing devices, without limit.

Similarly, data storage device or system 106 may store one or more types of data to be used by the use of force system 102. For example, and without limitation, general information about the incident 107A, type of use of force used 107B, officer 107C, subject 107D and interaction 107E, can be collected and stored in the system 106.

General information about the incident 107A may include location information, date and time information and weather conditions. General information about the incident may also include the case number, the names of the officers and subjects as well as the age, race, address and other pertinent information about the officer and subject.

Information about the type of force used or applied in the incident 107B can also be collected and stored in the system. The specific type of force used or applied may be identified, such as vehicle pursuit, physical action, OC spray, impact weapon, ECW discharge or firearm usage. Other information that can be collected and stored about the incident may include warnings, use-of-force sequence, charges, resisting arrest, injuries, etc. associated with the incident. A detailed narrative description of an incident may also be entered and stored, such as narrative reports from the police officer and any subject statements.

Officer information 107C can also be collected and stored for an incident. Officer information can include the officer identification information (e.g., officer name, officer number, etc.) as well as information about the officer at the time of the incident, e.g., whether the officer was in uniform or not, whether the officer was in a marked or unmarked police car, whether the officer was on duty, whether the office was alone or with a partner, etc. If there was another responding officer, similar information for that other officer can be entered and stored for the incident as well.

Subject information 107D can also be collected and stored for an incident. For example, subject information can include a subject's date of birth, occupation, whether the subject was armed, etc.

Information about the interaction for an incident 107E can also be collected and stored. Interaction information may include information about a single interaction or a series of interactions within an incident. Generally, the interaction information provides information about who contacted who, what type of contact was made, where on a person's body the contact took place and whether the subject resisted. For example, for a taser incident, a first interaction may be that the subject hit an officer with his first in the officer's left arm. A second interaction may be that the officer responded by discharging a taser at the subject's stomach.

Also, if a subject resisted an officer's request, that information can be collected as well. Similarly, if there is more than one interaction for an incident, information about each interaction can be collected and stored as well.

In addition, any injury information resulting from the incident can also be collected and stored. For example, if the officer or subject was injured as part of any of incidents or the interaction, that information can be collected and stored in the system.

Information about any weapon (e.g., a taser) used in an incident or interaction may also be collected and stored in the system. For example, name serial number and manufacturer of the taser may be collected.

The system can analyze the use of force for an incident or a single or several interactions based on the information collected and stored about the incident and other incidents over time.

Figure 2:
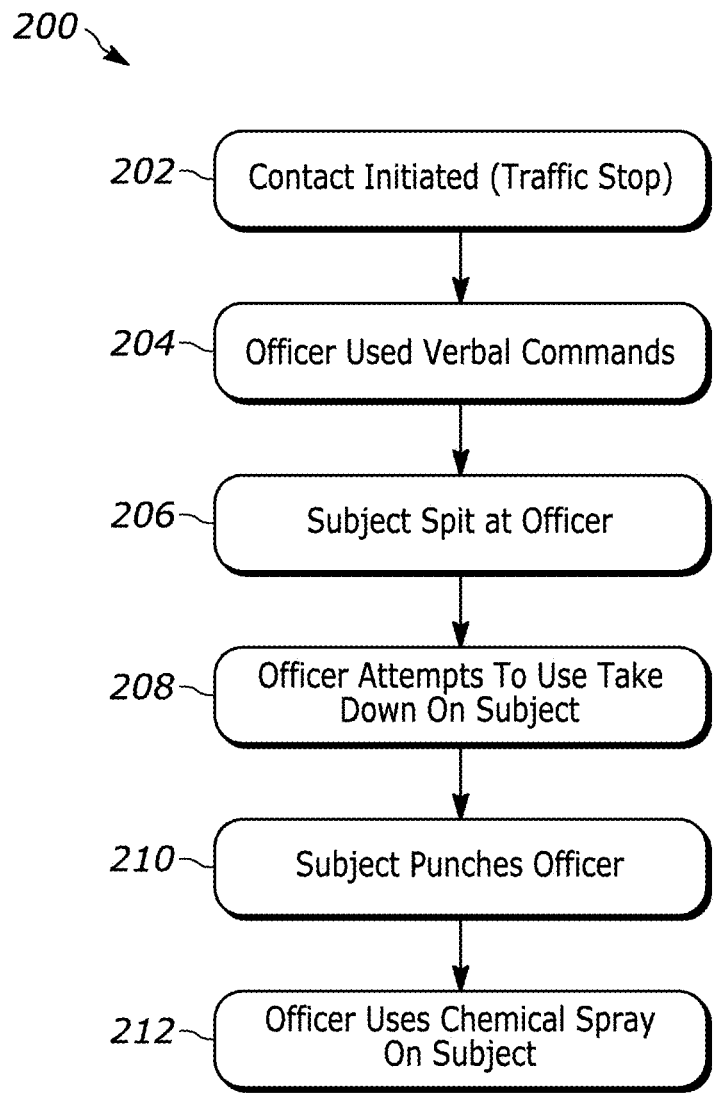
FIG. 2 is a flow diagram illustrating an example of a sequence of interactions in a first incident.

FIG. 2 illustrates a schematic flow diagram of a sequence or interactions in a first example of an incident 200. The incident 200 shows the following sequence of interactions relating to a traffic stop 202:

Interaction 1 (204): An officer asked a subject to get out of their car.

Interaction 2 (206): The subject refused and spit at an officer.

Interaction 3 (208): The officer pulled the subject through the window of his car Interaction 4 (210): The subject resisted and punched the officer in the head Interaction 5 (212): The officer used chemical spray in the subject's face and restrained the subject.

In the above sequence of interactions, the types of use of force applied by the officer were: asking the subject to get out of the car (Interaction 1) (204), pulling the subject through the window (Interaction 3) (208) and using chemical spray (Interaction 5) (212). Interactions 3 and 5 (208 and 212) are escalations of use of force by the officer in response to interactions from the subject as the use of force in Interactions 3 and 5 were greater than in the previous subject interactions.

Figure 3:
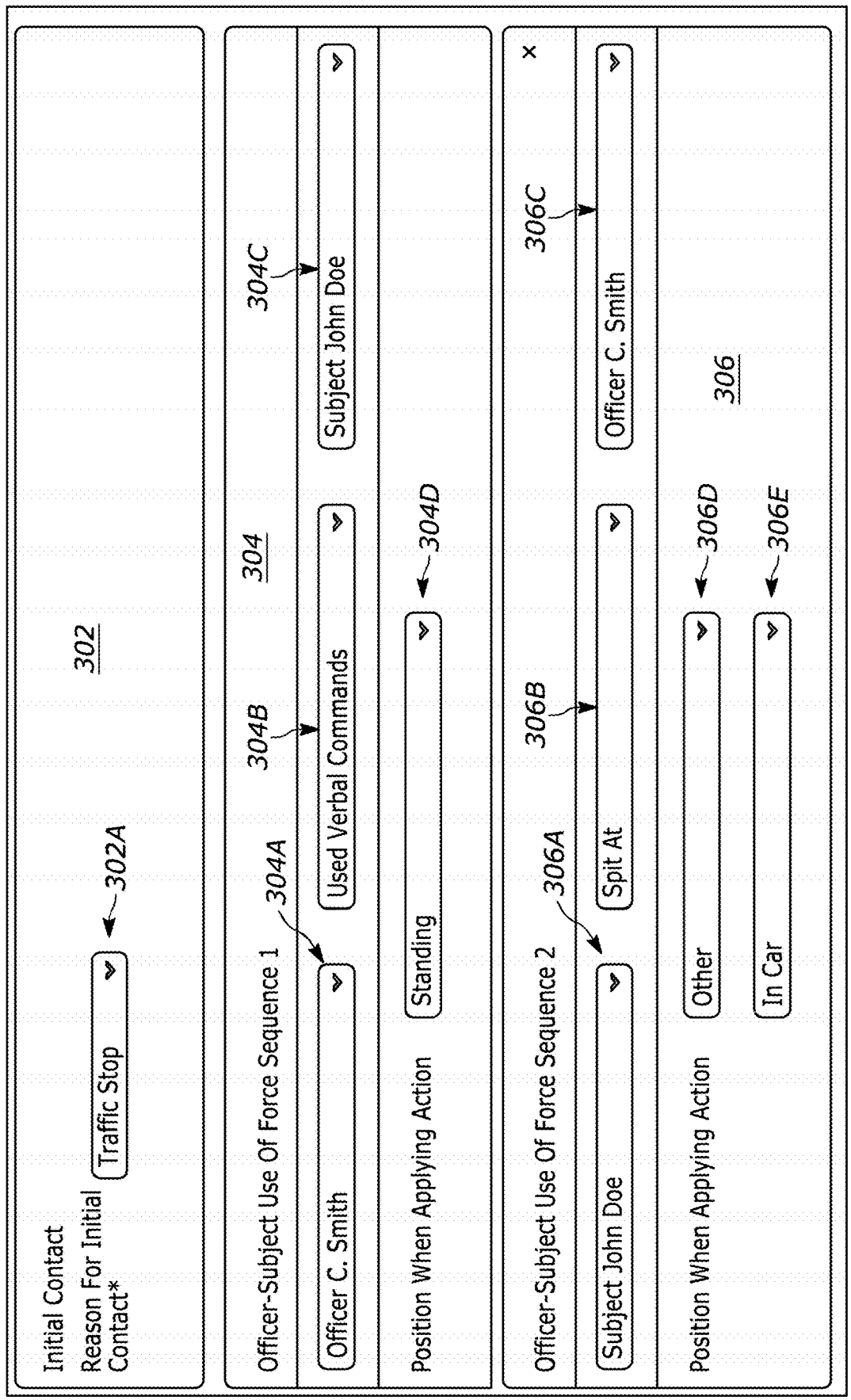
FIG. 3 is an illustration of an example user interface provided by the system for display by the user computing device.

As shown in FIG. 3, a user interface 300 with pre-populated drop down menus for interactions types and names, etc., can be provided by one or more components 103A-C in the system 102 to enter the information from the incident into the system 102 in an easy and more uniform manner and to store the information in the data storage system 106. As shown in FIG. 3, the information that can be entered may include information about the initial contact in block 302, including the reason for the initial contact. The information may be entered also may include information about the initial interaction and subsequent interaction(s) in blocks 304 and 306.

As shown in block 302, the reason for the initial contact can be entered via a drop down (e.g., a traffic stop) 302A.

As shown in block 304 information about the first interaction that can be provided via one or more drop downs is an identification of the person initiating the interaction (e.g., Officer Smith) 304A, the type of interaction (e.g., use of verbal command) 304B, and an identification of the person who the interaction was with (e.g., subject John Doe) 304C. Other information can be included via drop down, such as the position of the subject (e.g., the subject was sitting) 304D. Note that the officer's name can be used in these drop downs (as shown in 304A) in order to enable the system to compile information in the database or storage system 106 about the officer concerning this incident, as well as other incidents involving the same officer.

Similarly, as shown in block 306, information relating to a response to the first interaction can be provided via drop downs. For example, here, an identification of the person initiating the next interaction (e.g., subject John Doe) 306A, the type of interaction (e.g., spit at) 306B, and an identification of the person who the interaction was with (e.g., Officer Smith) 306C. Other information 306D can be included via drop down, such as the position of the subject (e.g., the subject was in the car) 306E.

Figure 4:
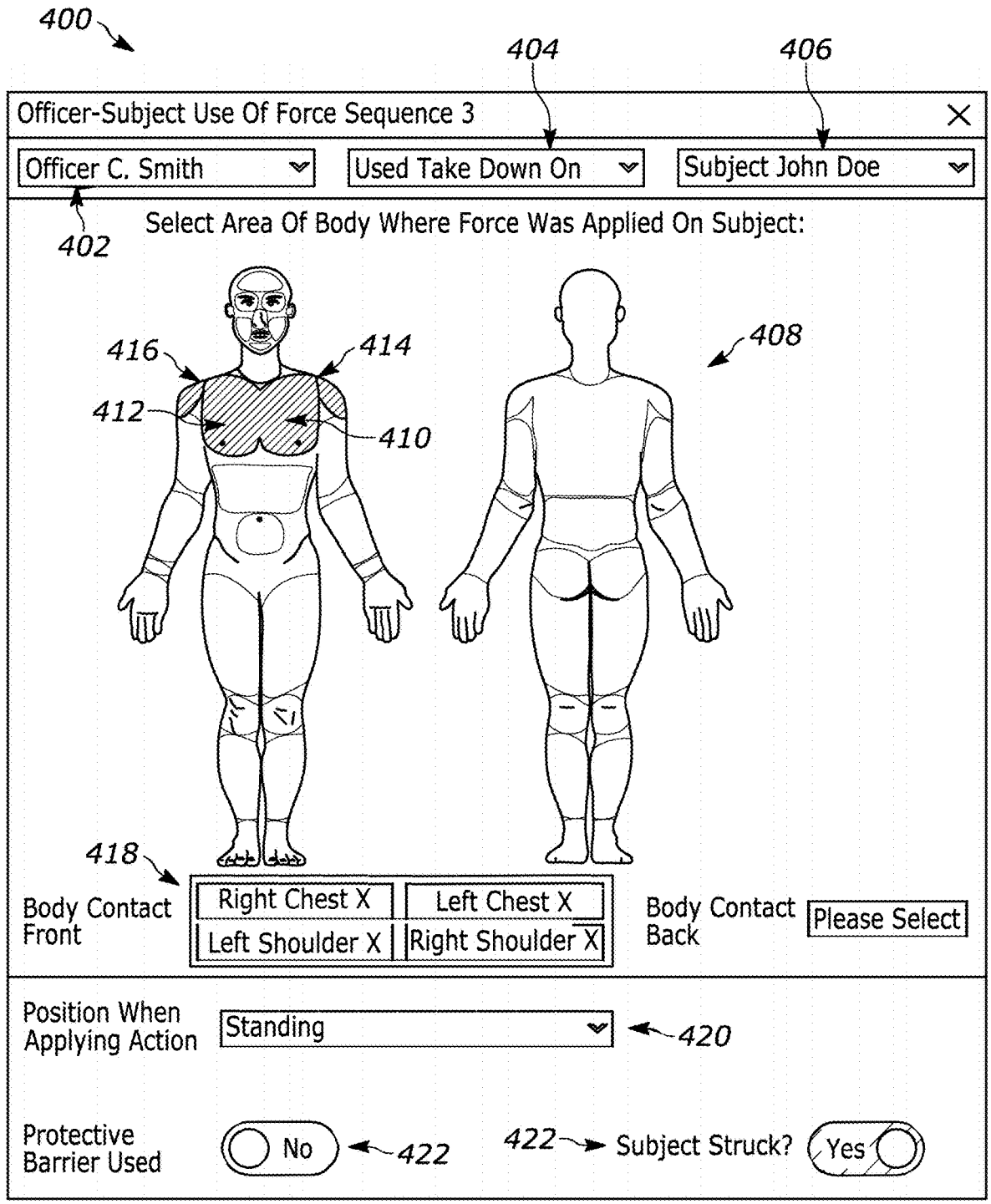
FIG. 4 is an illustration of another example user interface provided by the system for display by the user computing device.
Figure 5:
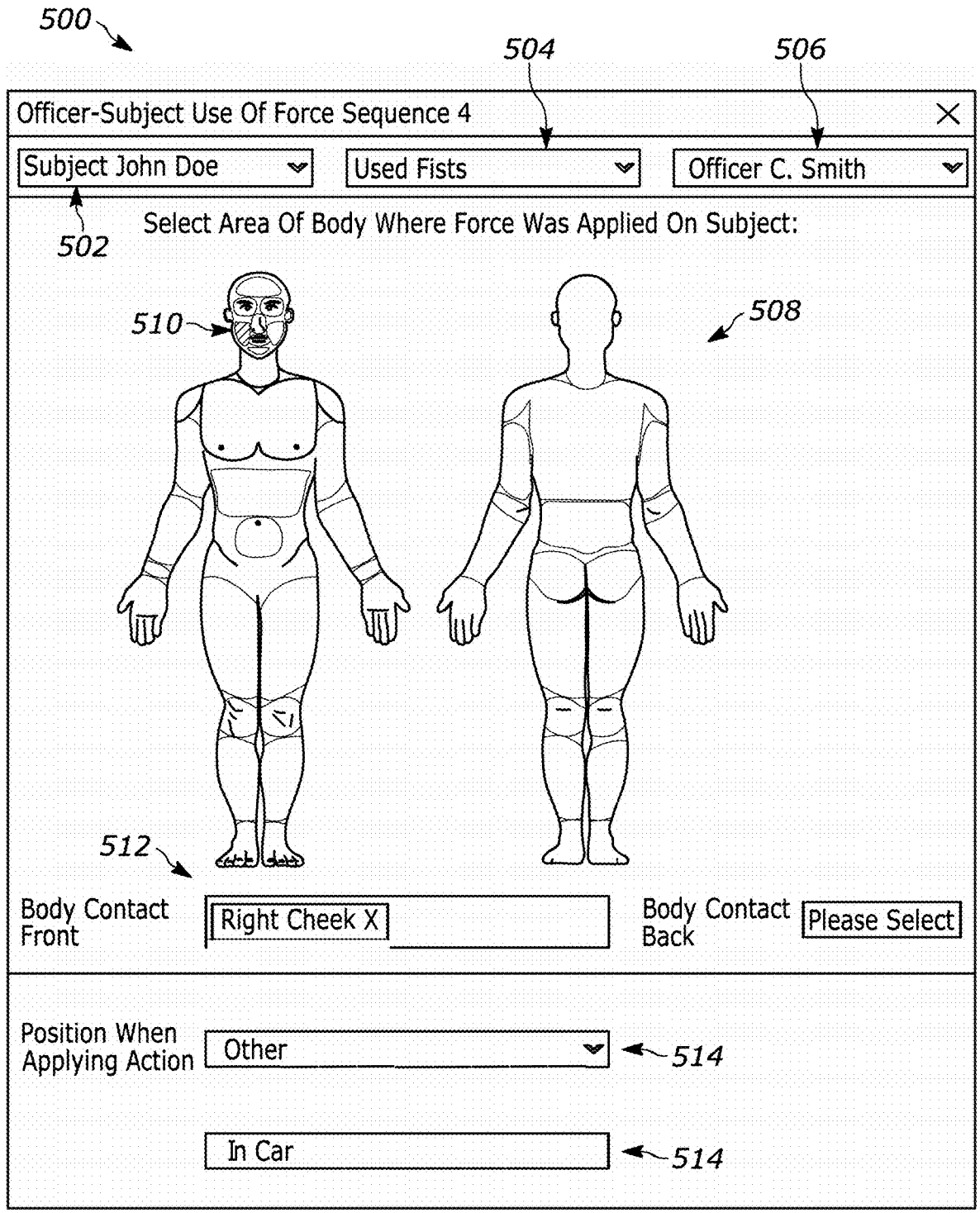
FIG. 5 is an illustration of another example user interface provided by the system for display by the user computing device.

Also as shown in FIGS. 4-6, in addition to drop downs, other interfaces can be provided by the system 102 to enter information about an interaction, including diagrams of a person's body to allow a user to indicate by selection (such as with a mouse, track pad or touch screen) what part of the body was contacted during certain types of interactions and toggles for yes or no answers to questions.

As shown in FIG. 4, a different user interface 400 may be used to enter information about the next interaction. For example, drop downs are used to enter information that Officer Smith 402, used a take down 404 on the subject 406. Then, using diagrams 408, a user can indicate by indicating in the diagram where the force was applied to the subject. As shown, the force was applied to the subject's right and left chest 410 and 412 and right and left shoulder 414 and 416. As shown, when an area is indicated or selected, it becomes highlighted to provide a visual confirmation of the selected area. The information entered by touching the diagram may also appear as text in a window 418 as another confirmation. Other information can be entered by drop down such as the position of the officer (e.g., standing) 420. Other information requested as "yes" or "no" answers, can be entered by toggle input, such as whether a protective barrier was used and whether the subject was struck (422).

As shown in FIG. 5, another user interface 500 may be used to enter information about the next interaction 500. Again, drop downs are used to enter information that the subject 502, used fists 504 on Officer Smith 506. Then, using diagrams 508, a user can indicate that the fists contacted the officer's right cheek 510, e.g., by touching the area on a diagram on an input screen. The information entered by touching the diagram may also appear as text in a window 512. Other information can be entered by drop down such as the position of the subject when applying the action (e.g., in the car) 514. Other information requested as "yes" or "no" answers, can be entered by toggle input, such as whether a protective barrier was used and whether the subject was struck 422.

As shown in FIG. 6, another user interface 500 may be used to enter information about the next interaction 600. Again, drop downs are used to enter information that Officer Smith 602, discharged chemicals 604, at the subject 606. Then, using diagrams 608, a user can indicate by touching the diagram that the chemicals were discharged in the subject's right eye, left eye and nose 610, 612 and 614. The information entered by touching the diagram may also appear as text in a window 616. Other information can be entered by adding text into boxes 618, 620, 622 and 624 such as the chemical type and chemical serial number, as well as the distance when the chemicals were first used and the distance when the chemical were last used. Other information can be added by additional drop downs 626 such as the position of the subject when applying the action. Other information requested as "yes" or "no" answers, can be entered by toggle inputs 628, 630, 632 and 634, such as whether a protective barrier was used, whether the subject was struck, whether the subject was decontaminated after usage and whether the chemical discharge was accidental.

With reference to the incident shown in FIGS. 2 and 3-6, FIG. 7 illustrates a screen 700 showing various scores that can be generated and/or displayed by one or more components 103A-C of the system 102 relating to the incident. For example, a score can be determined for each of the actions in the incident. In this example, the subject's "traffic violation" action is assigned a score of "0", and the officer's "verbal command" action is assigned a score of "1". In addition, the subject's "spit" action is assigned a score of "1", and the officer's "physical takedown" action is assigned a score of "2". In addition, the subject's "punch" action is assigned a score of "3", and the officer's "chemical spray" action is assigned a score of "3".

Other scores can be displayed or generated for the incident, such as scores for the "Starting Subject Action" (here, the "Traffic Violation"), "Starting Officer Action" (here, the "Verbal Commands", "Starting Proportionality", "Starting Escalation" (here, the difference between the scores for "Verbal Command" and "Traffic Violation"), Total Subject Action (here, the sum of the scores for the three subject actions), Total Officer Action (here, the sum of the scores for the three officer actions), "Subject Highest Action" (here, the highest action score is "2" for punch); "Officer Highest Action" (here, the highest action score is "3" for chemical spray), "Highest Action Proportion", "Highest Proportionality", "Subject Escalation" and "Officer Escalation".

The other values listed above are defined as follows:
"Starting Proportionality": The proportionality of the first application of force that the officer uses in response to resistance.
"Highest Action Proportionality": The proportionality of the highest resistance received and the highest force employed (regardless of where in the sequence they occurred).
"Highest Proportionality": The highest proportionality score found between each resistance/force step, regardless of where in the sequence it occurred. For example, if the first action was proportional with a score of 0, then the second action was highly disproportionate (e.g. using a firearm on passive resistance received with a score of 4), then the subject resistance increases and the officer force decreases (proportionality score might return to 0).

"Subject Escalation": The amount of change in resistance received from the subject in relation to the force used by the officer. (e.g., initially passive resistance then increases to flee, then increases to assault are all escalations in force all while the officer uses verbal commands would be escalation in resistance from the subject). An escalation at each step of 1 relative to the officer force and the previous resistance the subject used.

"Officer Escalation": The amount of change in force employed by the officer relative to their previous force and the escalation in resistance received from the subject. For example, where the subject continues to passively resist and the officer continues to escalate to higher and higher levels of force severity.

An overall score can also be determined by the system 102 for the overall interaction, i.e., the entire sequence of events or interactions in the incident. The overall score can be used to determine whether the overall force used by the officer was proportional to the resistance encountered from the subject. These scores can be measures of severity of an action and the proportionality of an action. The severity of an action is a measure of the level of the action itself (e.g., a measure of the level of an officer's use of force or a measure of the level of a subject's resistance), whereas the measure of the proportionality of an action is a measure of the action's level compared to a previous actions level, e.g., the measure of the level of an officer's use of force compared to the level of a subject's resistance. Each of these measures can be computed as averages or as overall scores. They can also be compared to aggregate scores or to scores for an officer's peers, i.e., a certain group of officers.

The system 102 can also determine for each step in the incident whether the force applied by the officer in that step was proportional to the resistance by the subject.

The system 102 can also look across each step to determine whether a change in the level of resistance by the subject resulted in a proportional change in use of force by the officer. For example, if the subject's resistance increased by one level, the scores may reflect whether the officer's use of force increased to a level that is one level above the resistance level (which may be within policy) or whether it increased by more than one level (which may not be within policy).

By determining the scores for the use of force and for the resistance levels, the system 102 can determine average escalation and average proportionality scores for a variety of different metrics, e.g., for an officer, for similar incidents, or for departments.

The goal is to determine whether the use of force is more or less that should be expected for a particular incident.

The system 102 can be used to process the information to determine: (1) whether the use of force by the officer in each interaction/step was proportional; (2) whether the overall result of the escalation was greater than expected and (3) provide a baseline of the severity that should have been used.

The system 102 can also generate a profile for an officer and/or for all officers or for a group of officers (e.g., all officers within a particular department or all officers within a particular location). The system 102 can determine an average score for use of force for an officer and compare it to an overall average use of force for a particular group of officers. For example, an officer's score can be compared to others, as follows: a composite peer group average is calculated for one or more metrics. The officer is then judged to be high/very high based on how far away the officer is from the peer group average. For example, an officer one standard deviation above the peer group average is considered high. The peer group model (and the risk profile model) may be determined by a system such as one described in U.S. patent application Ser. No. 17/132,458 filed Dec. 23, 2020, the specification of which is incorporated herein by reference. An example of a display screen showing a profile diagram on use of force in illustrated in FIG. 13. The disproportion force counts and percentages are shown in the rows for "Total Percent Adverse Events" and "Total Percent Disproportionate Force" which show Outlier Status of "Very High" and "High", respectively. The display for these outliers may be color coded relative to peer group. The remaining rows show use of force counts and percentages that are "Expected".

The officer's profile may also be used as a metric that can be input into a machine learning system to help determine whether a particular officer is at risk of a potential adverse event, such as a system described in U.S. patent application Ser. No. 17/132,458, the specification of which is incorporated herein by reference. The machine learning system may also be a component 102A-C of the system 102.

An officer's profile based on use of force can be generated and displayed visually on a user interface that illustrates the officer's profile alone and/or compared to a particular group of officers.

Figure 8:
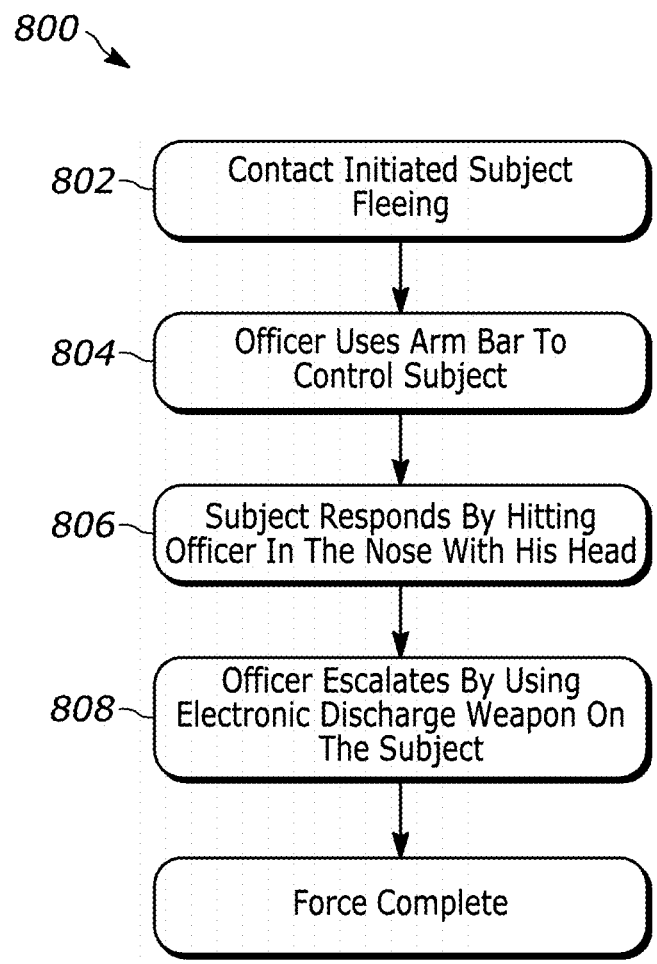
FIG. 8 is a flow diagram illustrating an example of a sequence of interactions in a second incident.

FIG. 8 illustrates a schematic flow diagram of a sequence or interactions in a second example of an incident 800. The incident shows the following sequence of interactions relating to a subject that is fleeing 802:

Interaction 1 (804): An officer used an arm bar to control the subject.

Interaction 2 (806): The subject responded by hitting the officer in the nose with his head.

Interaction 3 (808): The officer escalates by using electronic discharge weapon on the subject.

In the above sequence of interactions, the types of use of force applied by the officer were: using an arm bar to control the subject Interaction 1 (804) and using an electronic discharge weapon on the subject 2 Interaction 3 (808). Interaction 3 (808) is an escalation of use of force by the officer in response to the interaction from the subject. After Interaction 3, the use of force incident is complete 810

Although not shown for this incident, as described above, pre-populated drop down menus with interactions types and names, etc., can be provided to enter the information from the incident into the system 102 in an easy and more uniform manner and to store the information in the data storage system 106.

Figure 9:
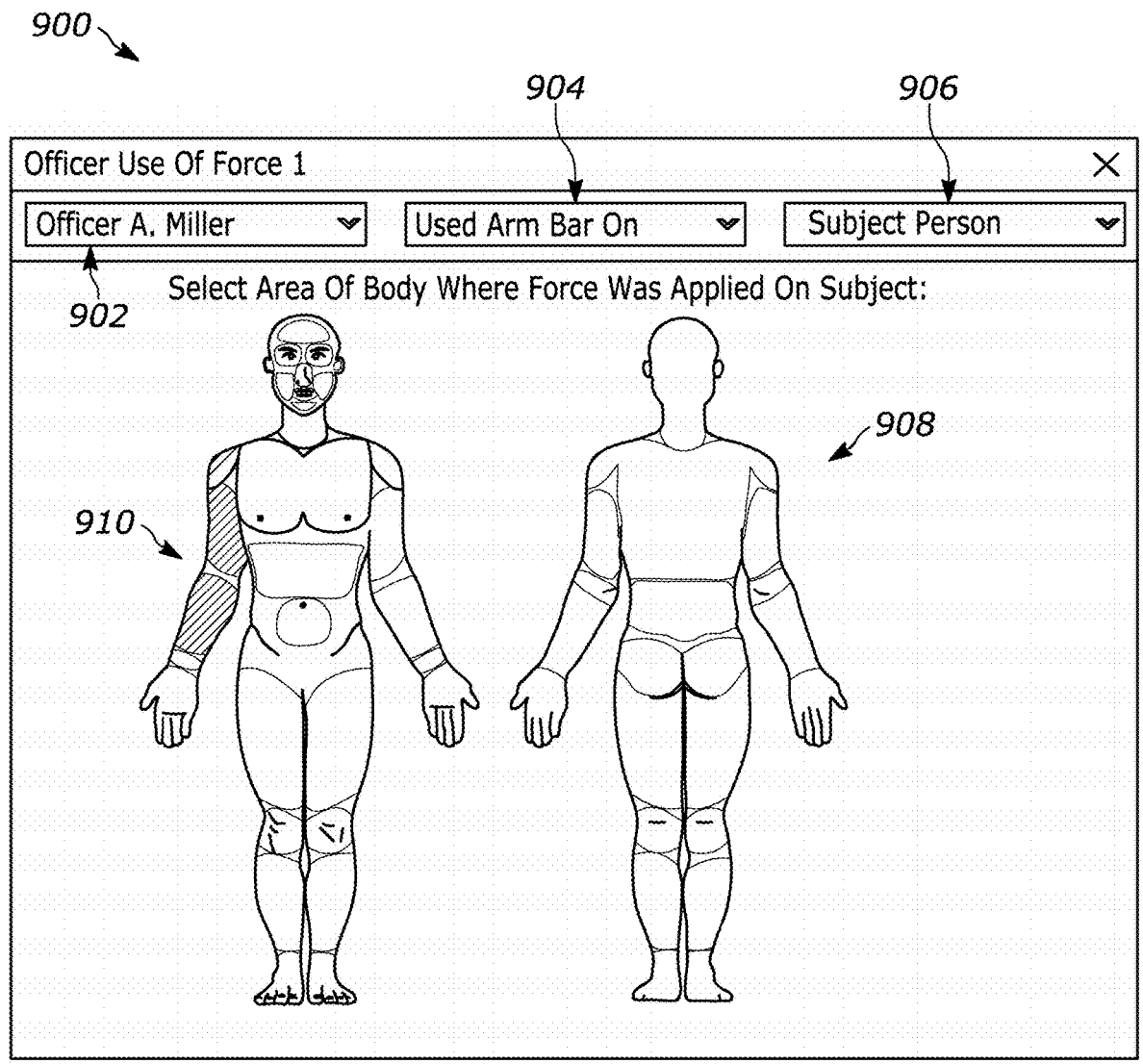
FIG. 9 is an illustration of another example user interface provided by the system for display by the user computing device.
Figure 10:
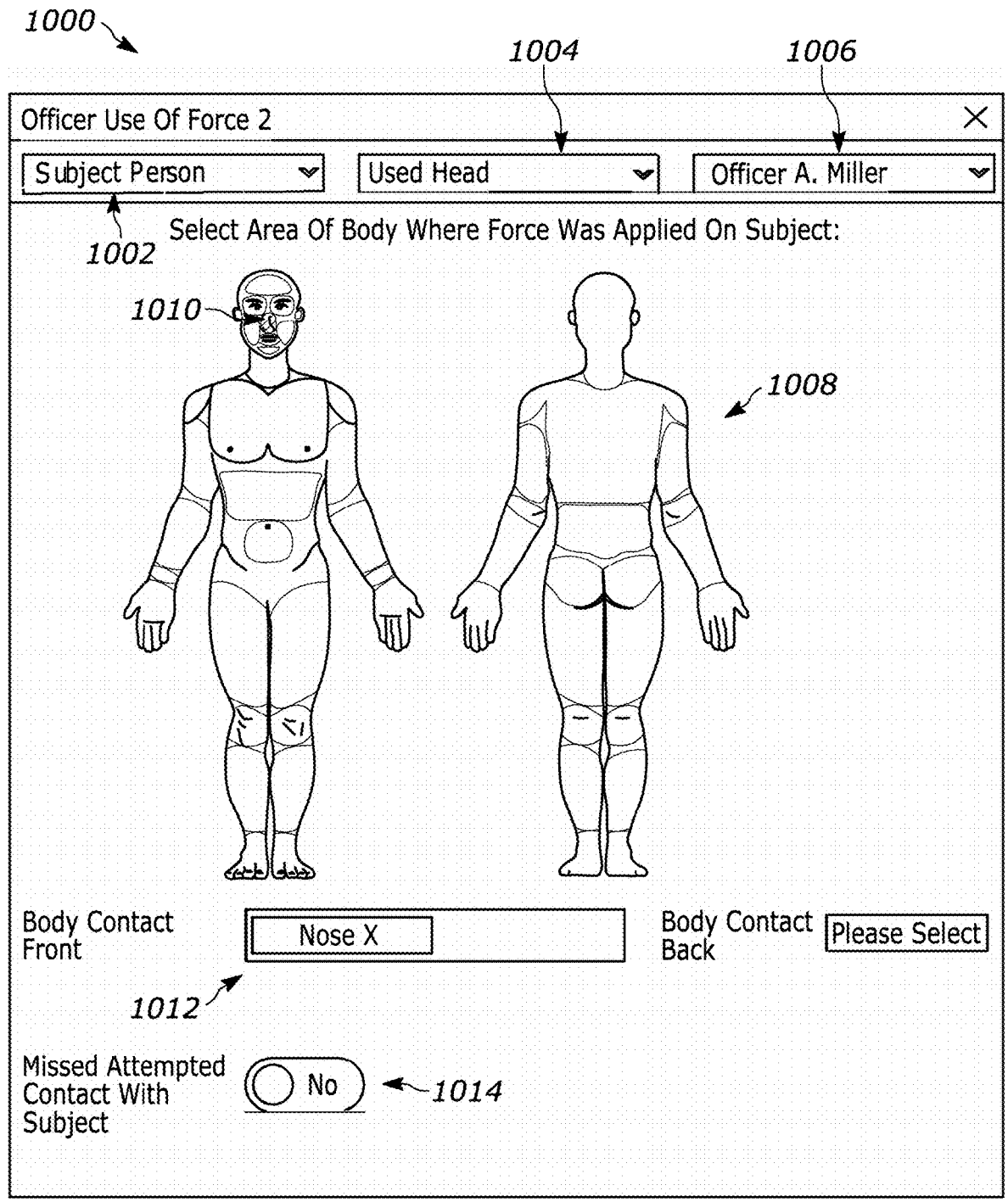
FIG. 10 is an illustration of another example user interface provided by the system for display by the user computing device.
Figure 11:
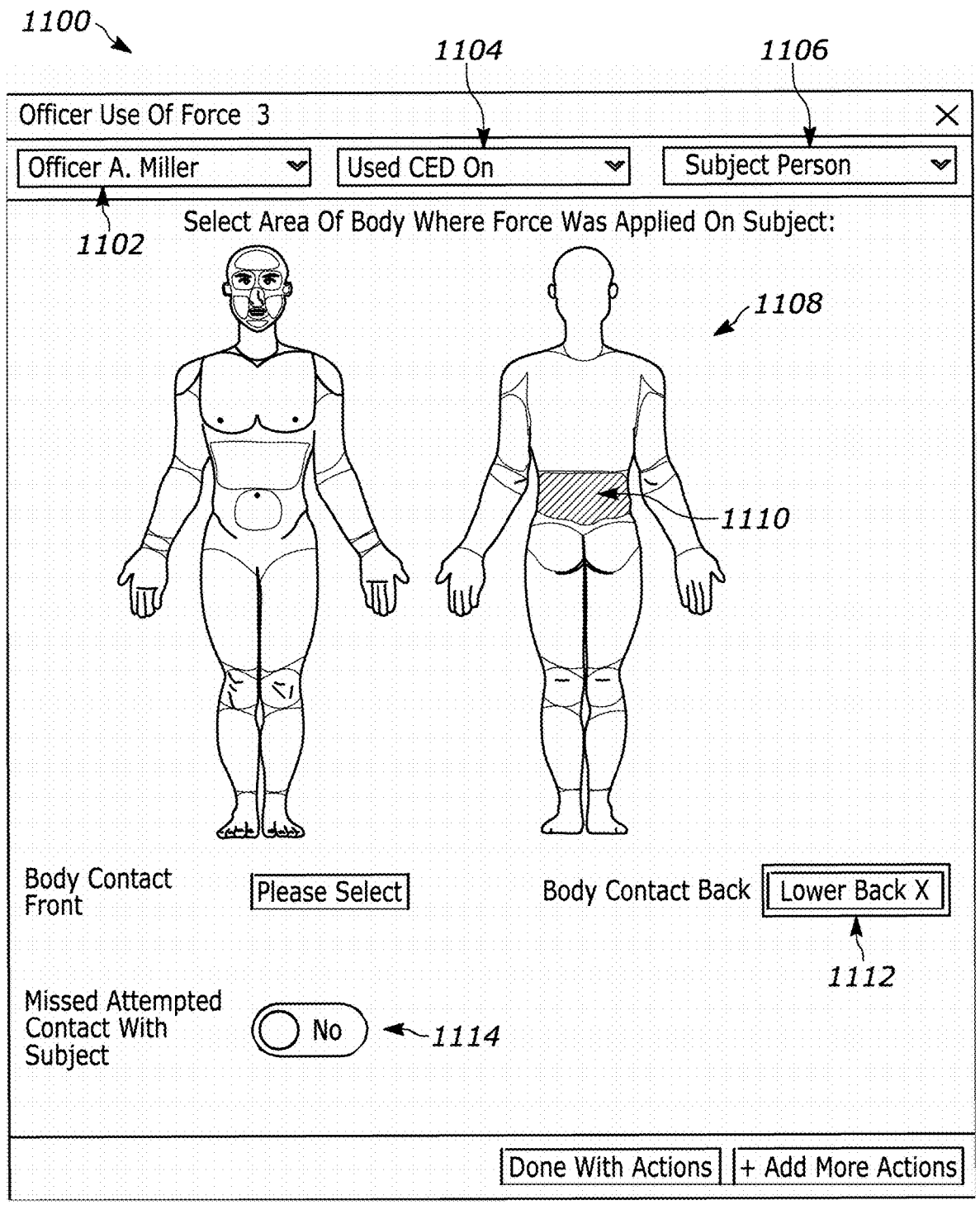
FIG. 11 is an illustration of another example user interface provided by the system for display by the user computing device.

Also as shown in FIGS. 9-11, various user interfaces 900, 1000 and 1100 with diagrams of a person's body and various drop downs can be provided by the system to allow a user to indicate by selection what part of the body was contacted and to enter other information about each interaction in an incident. These interfaces and methods of selection are similar to those described above with respect to FIGS. 4-6.

In FIG. 9, the user interface 900 provides drop downs used to enter information that Officer Smith 902, used an arm bar 904 on the subject 906. Then, using diagrams 908, a user can indicate by touching the diagram on the screen that the arm bar was applied to the subject on the subject's right arm 910.

In FIG. 10, the user interface 1000 provides drop downs d to enter information that the subject 1002, used his head 1004 on the officer 1006. Then, using diagrams 1008, a user can indicate by touching the diagram that the head was used applied to the officer's nose 1010. The information entered by touching the diagram may also appear as text in a window 1012. Other information requested as "yes" or "no" answers, can be entered by toggle input, such as whether the officer missed attempted contact with the subject (1014).

In FIG. 11, the user interface 1100 provides drop downs to enter information that the officer 1102, used an electronic discharge weapon ("CED") 1104 on the subject 1106. Then, using diagrams 1108, a user can indicate by touching the diagram on the screen that the weapon was applied to the subject's lower back 1110. The information entered by touching the diagram may also appear as text in a window 1112. Other information requested as "yes" or "no" answers, can be entered by toggle input, such as whether the officer missed attempted contact with the subject 1114.

With reference to the incident shown in FIG. 8, FIG. 12 illustrates a screen 1200 various scores that can be generated for the incident. For example, a score can be determined for each of the interactions. In this example, the subject's "flee" action is assigned a score of "0", and the officer's "physical arm bar" action is assigned a score of "2". In addition, the subject's "physical head to the officer's nose" action is assigned a score of "2", and the officer's use of an "electronic discharge weapon" is assigned a score of "3".

Other scores can be displayed or generated for the incident, such as scores for the "Starting Subject Action" (here, "fleeing"), "Starting Officer Action" (here, the "arm bar"), "Starting Proportionality", "Starting Escalation" (here, the difference between the scores for "fleeing" and "arm bar"), Total Subject Action (here, the sum of the scores for the two subject actions), Total Officer Action (here, the sum of the scores for the two officer actions), "Subject Highest Action" (here, the highest action score is "2" for use of head); "Officer Highest Action" (here, the highest action score is "3" for use of an electronic discharge weapon), "Highest Action Proportion", "Highest Proportionality", "Subject Escalation" and "Officer Escalation". The other values listed here are described above. This illustration also shows a total number of interactions.

Accordingly, a system, method, software, and variables for evaluating a police officer's use of force are described. More specifically, techniques are disclosed, wherein a system can construct collect, store and process information that can be used to determine use of force scores for an officer and to compare that officer's score to average scores for another individual or group of officers or to determine whether an officer's use of force in a particular incident it within policy or not.

The invention claimed is:

1. A computer-implemented method for determining a score reflecting the use of force that a police officer applied in an incident involving use of force, comprising:
   providing a computer system having a memory and a display;
   collecting and storing in the computer system's memory, information about the police officer involved in the incident;
   collecting and storing in the computer system's memory, information about a subject involved in the incident;
   generating, via a computing device, an interactive graphical user interface, including one or more selectable options from a drop down menu allowing the officer to interact with information about a sequence of interactions in the incident and including one or more selectable options from a diagram of a human body allowing the officer to interact with information about where force was applied to the subject;
   prompting, via the interactive graphical user interface on the computing device, the officer to select where force was applied to the subject by touching a location on the diagram of a human body on the interactive graphical user interface, wherein the diagram of the human body indicates a location as displayed on the graphical user interface as to where force was applied to the subject;
   storing in the computer system's memory the selected drop down option and selected location on the diagram of the human body,
   and generating, using the computer system, a use of force score for each interaction and determining, based on the use of force score for each interaction, a use of force score for the incident for the officer;
   displaying a user interface on the display, the user interface containing the use of force score;
   generating, using the computer system, at least one of: an (i) escalation score or (ii) a proportionality score, for the officer by comparing the use of force score for an interaction initiated by the officer to the use of force score for an immediately preceding interaction initiated by the subject; and
   displaying a user interface on the display, the user interface containing at least one of: (i) the escalation score or (ii) the proportionality score.

2. The computer-implemented method of claim 1 wherein,
   the use of force score for the incident for the officer is an overall use of force score for the incident.

3. The method of claim 1, wherein the step of generating, an interactive graphical user interface includes displaying one or more drop down menus for selection of information by the user.

4. The method of claim 1, wherein the step of generating, an interactive graphical user interface includes displaying one or more drawings of a person's body on a touch screen for selection by a user of parts of the body.

5. A computer system for collecting, storing and processing data relating to an incident involving a police officer's use of force during an incident, comprising:
   a component with instructions stored in memory and executable by a processor for collecting information about the police officer involved in the incident;
   a component with instructions stored in memory and executable by a processor for collecting information about a subject involved in the incident;
   a display with an interactive graphical user interface for displaying
   information about one or more selectable options from a drop down menu allowing the officer to interact with information about a sequence of interactions in the incident and including one or more selectable options from a diagram of a human body allowing the officer to interact with information about where force was applied to the subject;
   prompting, via the interactive graphical user interface on a computing device, the officer to select where force was applied to the subject by touching a location on the diagram of a human body on the interactive graphical user interface, wherein the diagram of the human body indicates a location as displayed on the graphical user interface as to where force was applied to the subject;

storing in the computer system's memory the selected drop down option and selected location on the diagram of the human body a component with instructions stored in memory and executable by a processor for collecting one or more selected interactions defining interactions between the police officer and the subject during the incident;

a component with instructions stored in memory and executable by a processor for generating a use of force score for the incident for the officer using a use of force score for each interaction during the incident;

a display with a user interface for displaying the use of force score for the incident for the officer, wherein the computing instructions, when executed by the processor, further cause the processor to:

generate at least one of: (i) an escalation score or (ii) a proportionality score, for the officer by comparing the use of force score for an interaction initiated by the officer to the use of force score for an immediately preceding interaction initiated by the subject; and display on the user interface at least one of: (i) the escalation score or (ii) the proportionality score.

6. The computer system of claim 5 wherein,
the use of force score for the officer is an overall use of force score for the incident.

7. The computer system of claim 5 wherein,
the use of force score for the officer is a use of force score for one interaction within the incident.

8. The computer system of claim 5 comprising,
a component with instructions stored in memory and executable by a processor for generating a use of force score for the subject for one or more interactions during the incident.

9. The computer system of claim 8 comprising:
a component with instructions stored in memory and executable by a processor for generating an escalation score for the officer by comparing the officer's use of force score for an interaction that responds to the subject's use of force score for an immediately preceding interaction.

10. The computer system of claim 8 comprising:
a component with instructions stored in memory and executable by a processor, for generating a proportionality score for the officer by comparing the officer's use of force score for an interaction that responds to the subject's use of force score for an immediately preceding interaction.

11. The computer system of claim 8 comprising:
a component with instructions stored in memory and executed by a processor, that uses machine-learning to create a metric from an officer's use of force scores;
the metric providing an indication of whether the officer is at risk of an adverse event.

12. A use of force score generation system in communication with a data storage system and a user computing device, the user computing device having a display, the use of force score generation system comprising:

a controller having a memory, the memory configured to store program instructions executable by the controller, wherein, in response to executing the program instructions, the controller is configured to:

collect from the user computing system, and store in the data storage system, information about a police officer involved in an incident and information about a subject involved in the incident;

generate, an interactive graphical user interface, including one or more selectable options from a drop down menu allowing the officer to interact with information about a sequence of interactions in the incident and including one or more selectable options from a diagram of a human body allowing the officer to interact with information about where force was applied to the subject;

prompt, via the interactive graphical user interface on the user computing device, the officer to select where force was applied to the subject by touching a location on the diagram of a human body on the interactive graphical user interface, wherein the diagram of the human body indicates a location as displayed on the graphical user interface as to where force was applied to the subject;

storing in the computer system's memory the selected drop down option and selected location on the diagram of the human body assign a score to each interaction based on the type of interaction, generate a use of force score for the officer for the incident based on the scores assigned to each interaction;

generate a user interface, which, when communicated to the user computing device, displays on the display the use of force score for the officer for the incident, the controller, in response to the officer's selections, also:

generates at least one of: (i) an escalation score or (ii) a proportionality score, for the officer for the incident by comparing the use of force score for an interaction initiated by the officer to a use of force score for an immediately preceding interaction initiated by the subject, and, generates a user interface, which, when communicated to the user computing device, displays on the user display at least one of: (i) the escalation score or (ii) the proportionality score, for the officer for the incident.

13. The system of claim 12 wherein,
the use of force score for the officer for the incident is an overall use of force score for the incident.

* * * * *